United States Patent Office 2,889,375
Patented June 2, 1959

2,889,375

METHOD OF DISTILLING ALCOHOLS

William I. Gilbert, Oakmont, and Arthur C. Whitaker, Fox Chapel, Pa., assignors to Gulf Research & Development Company, Pittsburgh, Pa., a corporation of Delaware No Drawing. Application May 21, 1956
Serial No. 585,932

6 Claims. (Cl. 260—643)

This invention relates to a process for purifying alcohols containing oxygenated impurities, more particularly a process for purifying alcohols produced in the Oxo process.

The process for the manufacture of alcohols from an olefin or olefins and a synthesis gas comprising hydrogen and carbon monoxide is generally known as the Oxo process. In the first stage of the process, sometimes referred to as the hydroformylation stage, an organic compound containing olefinic linkages is reacted with a synthesis gas comprising hydrogen and carbon monoxide at an elevated temperature and an elevated pressure in the presence of a metal of the iron group, such as cobalt, to produce a hydroformylation reaction product comprising predominantly aldehydes containing one more carbon atom than the reacted olefins, unreacted constituents, namely hydrogen, carbon monoxide and olefins, and the hydroformylation reaction catalyst in the form of a dissolved metal carbonyl. This hydroformylation reaction product is subsequently treated in a second stage to decompose and remove the metal carbonyl, after which the demetalled hydroformylation reaction product is passed to the hydrogenation stage where the aldehydes are hydrogenated in the presence of a hydrogenation catalyst, such as nickel, to the corresponding alcohols.

The alcohol produced in the Oxo process is employed widely, particularly in the making of detergents and plasticizers, and the purity thereof must be maintained at an extremely high level. Unfortunately there are produced in the Oxo process not only aldehydes, and subsequently alcohols, which are desirable, but also oxygenated impurities such as esters, ethers, lactones, ketones, anhydrides and mixtures thereof. Thus in the first, or hydroformylation reaction zone, some formic acid is believed to be formed along with a small amount of alcohol, and these materials react to form esters. Unfortunately these oxygenated impurities have about the same volatility as the Oxo alcohol, and therefore when the product from the hydrogenation zone is distilled these impurities are removed from the distillation zone along with the alcohol. These impurities impart to the alcohol a saponification number in excess of that which may be desirable in future processing of the alcohol, for example in preparing detergents and plasticizers. It is apparent, therefore, that in such case the saponification number of the finished alcohol must be reduced in order to render the Oxo alcohol commercially attractive. In addition to the above, the Oxo alcohol often contains a small amount of aldehyde, which is also objectionable. The amount of aldehyde in the alcohol increases as the activity of the hydrogenation catalyst in the hydrogenation reactor is reduced. The aldehyde, too, must be removed from the alcohol to make it commercially attractive.

We have found the saponification number of an impure alcohol containing oxygenated impurities as defined above, particularly an alcohol produced by the Oxo process, can be reduced and its aldehyde content lowered by a process which comprises distilling said alcohol in the presence of a controlled amount of a basic reacting alkaline earth metal compound. Particularly good results are obtained when the basic reacting alkaline earth metal compound is selected from the group consisting of oxides, hydroxides and carbonates. By "alkaline earth metal" we intend to include only the metals calcium, barium and strontium.

As noted, the present process finds great applicability in the purification of alcohols produced in the Oxo process. In particular, alcohols produced in an Oxo process wherein the reaction conditions are as set forth hereinafter can effectively be treated in accordance with the present invention to obtain an alcohol product having a low saponification number and a reduced aldehyde content.

In the hydroformylation reaction zone, an organic compound having olefinic linkages is reacted with hydrogen and carbon monoxide in the presence of a hydroformylation reaction catalyst at elevated temperatures and elevated pressures to obtain an aldehyde having one more carbon atom than said olefin. Practically any organic compound having olefinic linkages can be employed in the hydroformylation reaction stage, such as a monoolefin or diolefin, straight or branched, cycloolefin, etc. In particular olefins having from about 4 to about 20 carbon atoms are preferred, such as pentane, heptane, tetrapropylene, etc. Hydrogen to carbon monoxide mol ratio is preferably about 1:1, but can vary from about 0.75:1 to about 5:1. The temperature can be about 175° to about 450° F., preferably about 300° to 375° F., while the pressure is above about 1500 pounds per square inch, preferably about 3000 to 5000 pounds per square inch. The catalyst is preferably a cobalt salt of any suitable organic acid such as a fatty acid, preferably one containing at least 6 carbon atoms, or a naphthenic acid. Preferred salts are cobalt octanoate and cobalt naphthenate. In general, the catalyst should be introduced in an amount corresponding to about one atomic proportion of cobalt for each 600 mols of olefin, while one mol of olefin should be used per mol each of hydrogen and carbon monoxide.

The hydroformylation reaction product comprising aldehydes having one more carbon atom than the starting olefin, unreacted constituents such as hydrogen and carbon monoxide, the hydroformylation catalyst in the form of a dissolved metal carbonyl and one or more of the oxygenated compounds defined above is processed to remove carbon monoxide and hydrogen therefrom and thereafter passed to a demetalling zone wherein cobalt carbonyl and other metal carbonyls which may be present are removed. An suitable demetalling means can be employed. Thus, the demetalling chamber can be packed with an inert material such as pumice and steam can be introduced therein to obtain a temperature sufficiently high to decompose the metal carbonyl and deposit the free metal on the pumice. A temperature of about 200° to about 400° F. and a pressure of about 25 to about 500 pounds per square inch is sufficient for the demetalling operation.

The substantially demetalled hydroformylation reaction product is thereafter passed to a hydrogenation reactor packed with a hydrogenation catalyst wherein the aldehydes are hydrogenated to the corresponding alcohols. The pressure is maintained at about 50 to about 5000 pounds per square inch and the temperature at about 300° to about 400° F. The alcohol product is thereafter passed to a distillation zone wherein the alcohol is distilled leaving a heavy viscous bottoms product. The alcohol removed from the first distillation zone is passed to a second distillation zone wherein a further purification of the alcohol is sought. Temperatures and pressures and time in the latter zones will vary, of course, with the alcohol being distilled but in general the temperatures for a $C_5$ to $C_{21}$ alcohol will be about 265° to about 400° F. and the pressures about atmospheric to about 20 mm. Hg.

While we are not certain what takes place upon distillation of an impure alcohol product containing oxygenated impurities in the presence of a basic reacting alkaline earth metal compound, we believe that the aldehydes and ketones, at least, are condensed to heavier boiling products which remain behind in the distillation zone and are not removed with the alcohol. The esters are believed to be saponified by the defined basic reacting alkaline earth metal compound to an alcohol and an acid salt. The alcohol so freed is the same alcohol being distilled and thus increases the yield of the desired alcohol by as much as 3 to 4 percent.

The temperature of the treatment with the defined basic reacting alkaline earth metal compound can be the temperature of distillation but need not be. In the case of a $C_5$ to $C_{21}$ alcohol, for example, the temperature under the reaction conditions defined herein can be about 200° to about 400° F. The time of contact required to produce the desired alcohol product in accordance with this invention will of course vary with the alcohol being treated, the type and amount of impurities present, and the concentration and amount of the defined basic reacting alkaline earth metal compound. In general, a contact time of at least about 0.5 hour, preferably about one to about 16 hours, is preferred.

The ratio of the defined basic reacting alkaline earth metal compound to the alcohol being treated is not critical. The amount should be sufficient, however, to condense and/or saponify substantially all of the oxygenated impurities which are present. Generally, at least about 0.5 and preferably about 1 to 5 percent by weight of the basic reacting alkaline earth metal compound, based upon the impure alcohol, is sufficient. The defined basic reacting alkaline earth metal compound is preferably employed in the solid phase.

We have disclosed above that distillation of an impure alcohol, particularly an Oxo alcohol, containing oxygenated compounds as impurities, in the presence of a basic reacting alkaline earth metal compound will result in an alcohol product having a low saponification number and containing little or no aldehydes. Not all basic materials can be employed in the distillation stage, however, for distillation of an impure alcohol in the presence of many common basic materials gives rise to high losses to heavy material during the distillation. It is apparent that no appreciable loss of alcohol during the distillation can be tolerated in a commercial installation.

Examples 1 and 2 below show the exceedingly high losses occurring in the distillation of an alcohol in the presence of basic materials other than a basic reacting alkaline earth metal compound. The $C_8$ alcohol employed was made in the Oxo process as follows. One mol of heptene was hydroformylated with hydrogen and carbon monoxide having a mol ratio of about 1.25 to 1 in the presence of a catalytic amount of cobalt 2-ethylhexanoate at a pressure of about 3500 pounds per square inch and a temperature of about 350° F. to obtain a mixture comprising aldehydes. This mixture was passed to a demetalling zone packed with pumice. Steam and hydrogen were also passed therein to obtain a temperature in the demetalling zone varying from about 200° to about 400° F. The demetalled mixture leaving the demetalling zone is thereafter passed, along with sufficient hydrogen, to a hydrogenation zone packed with nickel and maintained at a temperature varying from about 300° to about 400° F. and a pressure of 1000 pounds per square inch wherein the aldehydes are hydrogenated to the corresponding alcohols. The $C_{16}$ alcohol employed was obtained by refluxing a portion of the $C_8$ alcohol so produced in the presence of 5 percent by weight of sodium hydroxide and 5 percent by weight of Raney nickel at a temperature of about 350° F. for a period of 4 to 6 hours. The $C_{16}$ alcohol was used mainly to raise the reflux temperature of the $C_8$ alcohol.

*Example 1*

80 grams of $C_8$ alcohol were mixed with 50 grams of $C_{16}$ alcohol, and to the resulting mixture there were added 1.6 grams of anhydrous sodium carbonate. The latter mixture was refluxed for 23 hours at a temperature of 200° C. Under these conditions about 20 percent by weight of the $C_8$ alcohol was lost as condensation product.

*Example 2*

100 grams of $C_8$ alcohol were mixed with 40 grams of $C_{16}$ alcohol, and to the resulting mixture were added 2 grams of sodium hydroxide pellets. The latter mixture was refluxed for 23 hours at a temperature of 190° C. Under these conditions about 80 percent by weight of the $C_8$ alcohol was lost as condensation product.

These results should be compared with the result obtained in Example 3 wherein magnesium hydroxide was employed in the distillation stage. Example 3 shows that the aldehyde content of an alcohol mixture containing aldehyde can go up rather than down when the mixture is distilled in the presence of some basic materials.

*Example 3*

A synthetic blend containing 99 percent by weight of isooctyl alcohol and 1.0 percent by weight of isooctyl aldehyde was refluxed at atmospheric pressure and a temperature of 360° F. for six hours in the presence of one percent by weight of magnesium hydroxide. The amount of aldehyde in the treated alcohol was raised to 1.33 percent by weight. The saponification number of the alcohol blend was 3.0 before treatment and 6.6 after treatment.

A study of Examples 1, 2 and 3 shows that not all basic materials can normally be employed in distilling impure alcohols to obtain a purified alcohol product. In no case could an 80 percent, or even 20 percent, loss of alcohol be tolerated in a commercial process. Neither should its aldehyde content be increased.

*Example 4*

To a mixture containing 50 grams of $C_8$ alcohol and 0.5 gram of isooctyl aldehyde (same alcohol as in Examples 1 and 2) was added 0.5 gram of anhydrous calcium hydroxide. This mixture was refluxed at a temperature of 175° C. for 16 hours. At the end of this time there was no noticeable conversion of $C_8$ alcohol to heavier product.

The treatment of an impure alcohol product containing oxygenated impurities in accordance with the present process to obtain an alcohol having a low saponification number and a reduced aldehyde content is further illustrated in the following examples.

*Example 5*

The alcohol employed in the present example is a $C_8$ alcohol made by the Oxo process under the same conditions used to make the alcohol of Examples 1 and 2. However, instead of using the alcohol product as such, the alcohol product was distilled in a conventional fractionation zone and that coming over between 360° and 366° F. at atmospheric pressure was employed. About 100 grams of this alcohol was distilled at atmosphere pressure in the presence of one percent by weight of calcium hydroxide. Before treatment, the alcohol had a saponification number of 7.8; after treatment, the saponification number was 1.7. No noticeable conversion of the $C_8$ alcohol to heavier product was noted.

*Example 6*

An intermediate cut of the same alcohol used above having a boiling point of 341° to 360° F. at atmospheric pressure was employed and distilled at atmospheric pressure in the presence of one percent by weight of calcium hydroxide. The saponification number of the alcohol before treatment was 6.8, while after treatment it had been reduced to 0.6. No conversion of $C_8$ alcohol to heavier product was noted.

*Example 7*

The same $C_8$ alcohol fraction employed in Example 5 was refluxed at atmospheric pressure and at a temperature of about 360° F. for two hours in the presence of one percent by weight of calcium hydroxide. Before treatment the aldehyde content of the alcohol was 1.64 percent by weight, while after treatment it had been reduced to 0.91 percent by weight. No conversion of $C_8$ alcohol product was noted.

*Example 8*

A synthetic blend containing 99.0 percent by weight of isooctyl alcohol and 1.0 percent by weight of isooctyl aldehyde was refluxed at atmospheric pressure and a temperature of 360° F. for 16 hours in the presence of one percent by weight of calcium hydroxide. The treated alcohol contained only 0.46 percent by weight of aldehyde and no conversion of $C_8$ alcohol to heavier product was noted.

*Example 9*

The same synthetic blend employed in Example 8 was refluxed at atmospheric pressure and a temperature of 360° F. for six hours in the presence of one percent by weight of barium hydroxide. The treated alcohol contained only 0.398 percent by weight of aldehyde, no conversion of $C_8$ alcohol to heavier product was noted, and the saponification number was reduced to 2.65. The saponification number of the alcohol before treatment was 3.0.

*Example 10*

The same synthetic blend employed in Example 8 was refluxed at atmospheric pressure and a temperature of 360° F. for 5 hours in the presence of one percent by weight of strontium hydroxide. The treated alcohol contained only 0.142 percent by weight of aldehyde, no conversion of $C_8$ alcohol to heavier product was noted, and the saponification number was reduced to 0.75.

*Example 11*

The run described in Example 10 was repeated except that one percent by weight of calcium oxide was used in place of strontium hydroxide. The treated alcohol contained only 0.16 percent by weight of aldehyde, no conversion of $C_8$ alcohol to heavier product was noted, and the saponification number was reduced to 1.50.

*Example 12*

The run described in Example 10 was also repeated with one percent by weight of barium oxide in place of strontium hydroxide. Only 0.179 percent by weight of aldehyde remained in the treated alcohol, no conversion of $C_8$ alcohol to heavier product was noted, and the saponification number was reduced to 1.65.

*Example 13*

The run described in Example 10 was additionally repeated with one percent by weight of calcium carbonate in place of strontium hydroxide. Only 0.169 percent by weight of aldehyde remained in the treated alcohol, no conversion of $C_8$ alcohol to heavier product was noted, and the saponification number was reduced to 1.8.

Note from the examples that the saponification number of the alcohol was reduced from an exceedingly high number to a very low one by the relatively simple expedient of distilling the alcohol in the presence of a small amount of a basic reacting alkaline earth metal compound. The aldehyde content of the alcohol was also substantially reduced by treatment in accordance with the process of this invention. In no case, however, was there any appreciable conversion of the alcohol to heavier product.

Obviously many modifications and variations of the invention as hereinabove set forth may be made without departing from the spirit and scope thereof and therefore only such limitations should be imposed as are indicated in the appended claims.

We claim:
1. In a process for obtaining a purified alcohol from one which has been produced by reacting an olefin having from 4 to 20 carbon atoms with carbon monoxide and hydrogen in the presence of a hydroformylation reaction catalyst at elevated pressures and temperatures to obtain a hydroformylation reaction product comprising an aldehyde having one more carbon atom than said olefin, said hydroformylation reaction catalyst and at least one oxygenated compound selected from the group consisting of esters, ethers, lactones, ketones and anhydrides, demetalling said hydroformylation reaction product to remove said hydroformylation reaction catalyst therefrom, and hydrogenating said demetalled product to obtain a mixture comprising an alcohol corresponding to said aldehyde, unreacted aldehyde and said oxygenated compound, the improvement which comprises reducing the saponification number and lowering the aldehyde content of said mixture by distilling the same in the presence of a basic reacting alkaline earth metal compound selected from the group consisting of calcium, barium and strontium oxides, hydroxides and carbonates at a temperature of about 200° to about 400° F. for about one-half to about 16 hours.

2. The process of claim 1 wherein the basic reacting alkaline earth metal compound is calcium hydroxide.

3. The process of claim 1 wherein the basic reacting alkaline earth metal compound is calcium oxide.

4. The process of claim 1 wherein the basic reacting alkaline earth metal compound is strontium hydroxide.

5. The process of claim 1 wherein the basic reacting alkaline earth metal compound is barium oxide.

6. The process of claim 1 wherein the basic reacting alkaline earth metal compound is calcium carbonate.

References Cited in the file of this patent

UNITED STATES PATENTS

| | | |
|---|---|---|
| 2,131,925 | Ware | Oct. 4, 1938 |
| 2,139,179 | Tulleners | Dec. 6, 1938 |
| 2,713,075 | Doeringer et al. | July 12, 1955 |

OTHER REFERENCES

Brunel et al.: J.A.C.S. vol. 43, pp. 561–575 (1921).